US007751388B2

(12) United States Patent
White et al.

(10) Patent No.: US 7,751,388 B2
(45) Date of Patent: *Jul. 6, 2010

(54) ETHERNET-BASED BROADBAND COMMUNICATION CHANNEL METHODS AND SYSTEMS

(75) Inventors: Russell William White, Austin, TX (US); Alicia Marie Russell, Austin, TX (US); Ahmad Ansari, Austin, TX (US); Weijing Chen, Austin, TX (US); Stephen Mark Mueller, Austin, TX (US); Dinesh Nadaralah, Austin, TX (US); Chin Yuan, San Ramon, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 576 days.

This patent is subject to a terminal disclaimer.

(21) Appl. No.: 11/649,552

(22) Filed: Jan. 4, 2007

(65) Prior Publication Data

US 2007/0110041 A1 May 17, 2007

Related U.S. Application Data

(63) Continuation of application No. 10/895,241, filed on Jul. 19, 2004, now Pat. No. 7,606,218, which is a continuation of application No. 10/191,981, filed on Jul. 8, 2002, now Pat. No. 6,785,265.

(51) Int. Cl.
*H04L 12/56* (2006.01)
*H04L 12/66* (2006.01)
*H04B 10/20* (2006.01)
*H04M 11/00* (2006.01)

(52) U.S. Cl. .......... 370/352; 370/395.52; 370/401; 379/93.01; 379/93.29; 398/58

(58) Field of Classification Search .......... 370/352, 370/395.52, 401; 379/93.01, 93.29; 398/58
See application file for complete search history.

(56) References Cited

U.S. PATENT DOCUMENTS

| 5,790,548 | A | 8/1998 | Sistanizadeh et al. |
| 6,101,182 | A | 8/2000 | Sistanizadeh et al. |

(Continued)

FOREIGN PATENT DOCUMENTS

WO    2004006050 A3    1/2004

OTHER PUBLICATIONS

United States Patent and Trademark Office, "Notice of Allowance," issued in connection with U.S. Appl. No. 10/895,241, mailed Jun. 17, 2009 (4 pages).

(Continued)

*Primary Examiner*—Alpus H Hsu
(74) *Attorney, Agent, or Firm*—Hanley, Flight & Zimmerman, LLC

(57) ABSTRACT

A broadband communication channel access network comprises an Ethernet device disposed in a serving area interface. The Ethernet device serves as an Ethernet bridge for a neighborhood service area. The Ethernet device communicates with a plurality of customer premises modems in the neighborhood service area. An Ethernet switch disposed at a central office communicates with the Ethernet device via a fiber optic medium using an Internet Protocol over a second Ethernet standard. The Ethernet switch provides a packet data core network termination.

32 Claims, 5 Drawing Sheets

U.S. PATENT DOCUMENTS

| | | | |
|---|---|---|---|
| 6,343,083 B1 | 1/2002 | Mendelson et al. | |
| 6,388,990 B1 | 5/2002 | Wetzel | |
| 6,404,861 B1 | 6/2002 | Cohen et al. | |
| 6,452,925 B1 | 9/2002 | Sistanizadeh et al. | |
| 6,463,055 B1 | 10/2002 | Lupien et al. | |
| 6,483,903 B1 | 11/2002 | Itay et al. | |
| 6,498,806 B1 | 12/2002 | Davis | |
| 6,587,476 B1 | 7/2003 | Lewin et al. | |
| 6,674,749 B1 | 1/2004 | Mattathil | |
| 6,711,138 B1 | 3/2004 | Pai et al. | |
| 6,785,265 B2 | 8/2004 | White et al. | |
| 6,798,751 B1 | 9/2004 | Voit et al. | |
| 6,798,769 B1 * | 9/2004 | Farmwald | 370/352 |
| 6,829,252 B1 | 12/2004 | Lewin et al. | |
| 6,831,921 B2 | 12/2004 | Higgins | |
| 6,888,834 B1 | 5/2005 | Wood et al. | |
| 6,904,054 B1 | 6/2005 | Baum et al. | |
| 6,963,561 B1 | 11/2005 | Lahat | |
| 7,007,296 B2 | 2/2006 | Rakib | |
| 7,606,218 B2 | 10/2009 | White et al. | |
| 2002/0010818 A1 | 1/2002 | Wei et al. | |
| 2004/0172658 A1 | 9/2004 | Rakib et al. | |
| 2004/0213147 A1 * | 10/2004 | Wiese et al. | 370/216 |
| 2004/0213189 A1 * | 10/2004 | Alspaugh et al. | 370/338 |
| 2005/0025175 A1 | 2/2005 | White et al. | |

OTHER PUBLICATIONS

United States Patent and Trademark Office, "Office Action," issued in connection with U.S. Appl. No. 10/895,241, mailed Dec. 15, 2008 (9 pages).

United States Patent and Trademark Office, "Office Action," issued in connection with U.S. Appl. No. 10/895,241, mailed Jun. 12, 2008 (9 pages).

United States Patent and Trademark Office, "Office Action," issued in connection with U.S. Appl. No. 10/895,241, mailed Sep. 26, 2007 (9 pages).

United States Patent and Trademark Office, "Office Action," issued in connection with U.S. Appl. No. 10/895,241, mailed Apr. 12, 2007 (8 pages).

United States Patent and Trademark Office, "Office Action," issued in connection with U.S. Appl. No. 10/895,241, mailed Jan. 29, 2007 (7 pages).

United States Patent and Trademark Office, "Office Action," issued in connection with U.S. Appl. No. 10/895,241, mailed Aug. 15, 2006 (7 pages).

United States Patent and Trademark Office, "Notice of Allowance," issued in connection with U.S. Appl. No. 10/191,981, mailed May 24, 2004 (4 pages).

United States Patent and Trademark Office, "Office Action," issued in connection with U.S. Appl. No. 10/191,981, mailed Sep. 29, 2003 (7 pages).

International Search Report, issued by the World Intellectual Property Office on Dec. 9, 2003, in connection with International Application No. PCT/US03/19149, 4 pages.

* cited by examiner

AT ETHERNET
SWITCH/ROUTER

AT REMOTE
ETHERNET DEVICE

AT CPE

ETHERNET-BASED BROADBAND COMMUNICATION CHANNEL METHODS AND SYSTEMS

RELATED APPLICATIONS

The present application is a continuation of U.S. patent application Ser. No. 10/895,241 now U.S. Pat. No. 7,606,218, filed Jul. 19, 2004, which is a continuation of U.S. patent application Ser. No. 10/191,981 (now U.S. Pat. No. 6,785,265), filed Jul. 8, 2002, the entirety of both of which are hereby incorporated by reference.

BACKGROUND

1. Field of the Invention

The present invention relates to Digital Subscriber Line (DSL) methods and systems.

2. Description of the Related Art

DSL is a well known technology for providing high-speed access to the Internet. Each premise of a DSL subscriber is equipped with a DSL modem. The DSL modem communicates via existing telephone lines with a DSL Access Multiplexer (DSLAM) located at a telephone company office such as a central office. The DSLAM may serve hundreds of DSL subscribers located in a servicing area. The DSLAM aggregates traffic received from various DSL subscribers to send to a network center via a fiber optic link. The network center, in turn, provides access to a packet data core network, which provides access to the Internet.

Some DSL subscribers are served by digital loop carriers (DLCs). DLCs are located remotely from a central office to serve subscribers who have no direct connection to the central office.

A Media Access Control (MAC) layer is a layer of a distributed communications system concerned with the control of access to a medium that is shared between two or more entities. In DSL applications, the MAC layer comprises an Asynchronous Transfer Mode (ATM) layer between the DSL modem and the DSLAM or DLC, and an ATM layer between the DSLAM or DLC and the network center which provides the packet data core network.

A measure of service quality provided to a subscriber is known as Quality of Service (QoS). For ATM connections, the QoS can be measured by parameters such as Cell Error Ratio, Severely Errored Cell Block Ratio, Cell Loss Ration, Cell Misinsertion Rate, Cell Transfer Delay, Mean Cell Transfer Delay and Cell Delay Variability. Since DSL access networks use ATM layers, the QoS for DSL is defined with respect to ATM.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF THE DRAWINGS

Disclosed herein are embodiments of a DSL access network in which the ATM layer is removed from both the F1 and F2 interfaces, and replaced with Ethernet. More specifically, ATM is replaced with Ethernet at the MAC layer (layer 2) at the following interfaces: (a) between the customer premises equipment (CPE) and a remote Ethernet device (RED) terminal, and (b) between the RED terminal and a packet data core network. Benefits of embodiments of the present invention include a significant reduction in the cost and complexity of providing DSL service, and an ability to offer QoS at the Internet Protocol (IP) layer (layer 3) using flow-based QoS such as Resource Reservation Protocol (RSVP), class-based QoS such as Differentiated Services (diffServ), and/or traffic engineering such as Multiprotocol Label Switching (MPLS).

Figure 1:
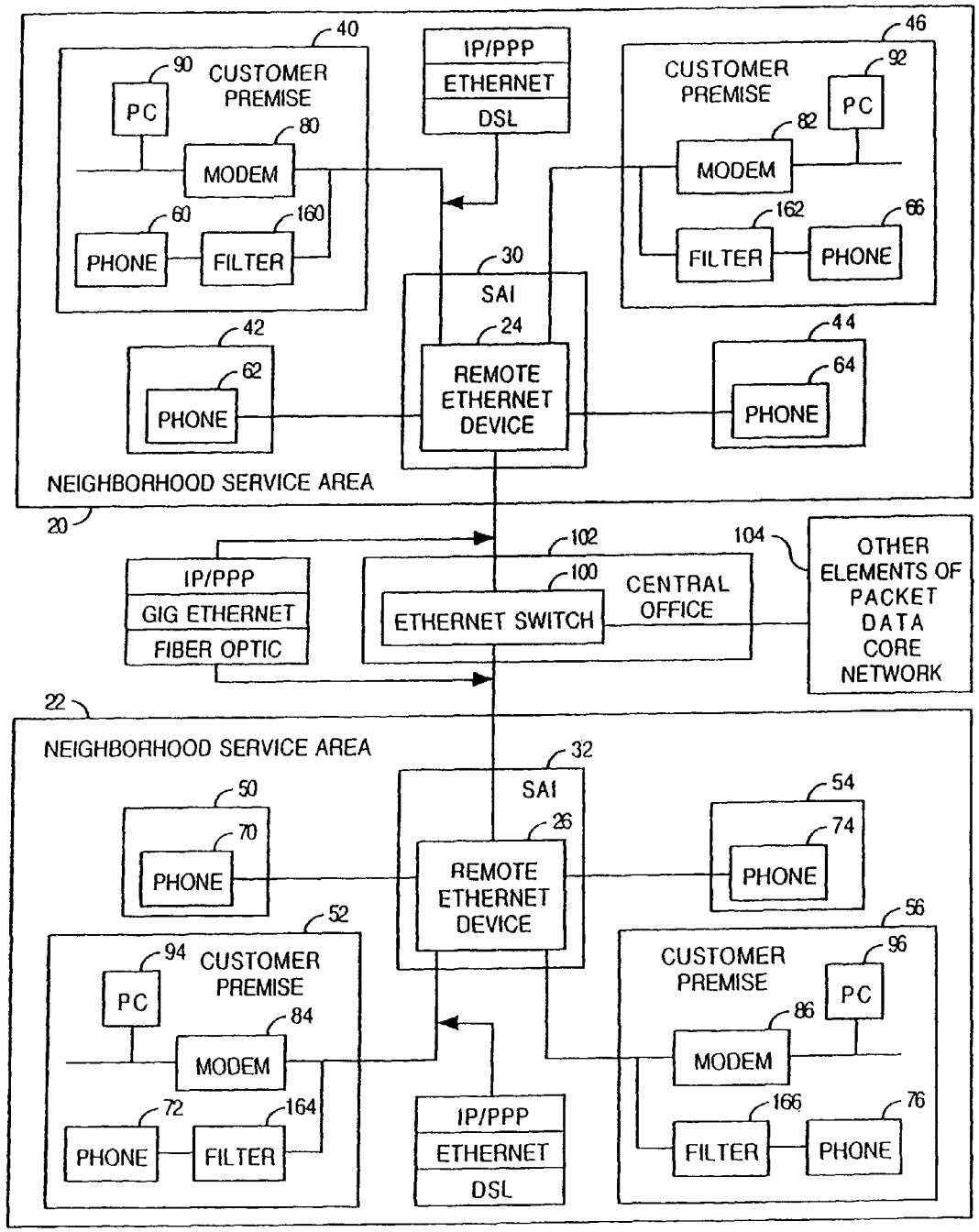
FIG. 1 is a block diagram of an embodiment of an Ethernet-based DSL system.

FIG. 1 is a block diagram of an embodiment of an Ethernet-based DSL system. The DSL system serves an area partitioned into a plurality of neighborhood service areas. For simplicity in describing the present invention, two neighborhood service areas 20 and 22 are illustrated, although those having ordinary skill in the art will appreciate that more than two neighborhood service areas can be served by the DSL system.

Each neighborhood service area is served by at least one remote Ethernet device. The neighborhood service area 20 is served by a remote Ethernet device 24, and the neighborhood service area 22 is served by a remote Ethernet device 26. The remote Ethernet device 24 is located at a serving area interface (SAI) 30 for the neighborhood service area 20. The remote Ethernet device 26 is located at an SAI 32 for the neighborhood service area 22.

Each SAI 30 and 32 typically comprises an F1-F2 connection cross box to provide telephone service to customers in its corresponding neighborhood service area 20 and 22, although this is not necessary in other embodiments. Each SAI 30 and 32 may be located in a corresponding utility box, for example, either underground, at ground level or attached to a utility pole. Each SAI 30 and 32 may be located on an easement, i.e. public or private land which a public utility company has a right to use for a specific purpose but is owned by a party other than the public utility company.

Each neighborhood service area comprises a plurality of customer premises. For purposes of illustration and example, the neighborhood service area 20 comprises customer premises 40, 42, 44 and 46, and the neighborhood service area 22 comprises customer premises 50, 52, 54 and 56. Those having ordinary skill in the art will appreciate that each neighborhood service area may comprise other numbers of customer premises. Typically, each neighborhood service area may serve customer premises up to 6000 feet away from its serving area interface.

Each of the customer premises 40, 42, 44 and 46 has telephone service provided via telephone lines from the SAI 30. To illustrate the telephone service, the customer premises 40, 42, 44 and 46 have telephones 60, 62, 64 and 66, respectively, coupled to the telephone lines from the SAI 30. Similarly, each of the customer premises 50, 52, 54 and 56 has telephone service provided via telephone lines from the SAI 32. To illustrate the telephone service, the customer premises 50, 52, 54 and 56 have telephones 70, 72, 74 and 76, respectively, coupled to the telephone lines from the SAI 32.

Each of the remote Ethernet devices serves as an Ethernet bridge for its neighborhood service area. Thus, the remote Ethernet device 24 serves as an Ethernet bridge for Ethernet-based DSL subscribers in the neighborhood service area 20, and the remote Ethernet device 26 serves as an Ethernet bridge for Ethernet-based DSL subscribers in the neighborhood service area 22.

Each of the remote Ethernet devices communicates with customer premises modems in its neighborhood service area using an Internet Protocol over a first Ethernet standard with a digital subscriber line physical layer. Preferably, the first Ethernet standard comprises a Twisted Ethernet standard suitable for communicating data over a twisted pair transmission line, such as a standard telephone transmission line running to the customer premises. Alternatively, the first Ethernet standard comprises another wire-based Ethernet standard for communicating data over a wire transmission line.

The description of the digital subscriber line physical layer between the customer premises modems and the remote Ethernet devices may be based on any standard or non-standard scheme. For example, the digital subscriber line physical layer may be based on at least one of Data Over Cable Service Interface Specifications (DOCSIS), Asymmetric Digital Subscriber Line (ADSL), Very-high-data-rate Digital Subscriber Line (VDSL), Symmetrical Digital Subscriber Line (SDSL), and Multirate DSL (MDSL).

For purposes of illustration and example, consider the customer premises 40, 46, 52 and 56 being Ethernet-based DSL subscribers. The customer premises 40, 46, 52 and 56 are equipped with Ethernet-based DSL modems 80, 82, 84 and 86, respectively. Each of the Ethernet-based DSL modems 80, 82, 84 and 86 communicates with one or more network terminals, such as personal computers 90, 92, 94 and 96, respectively, at the customer premises. The remote Ethernet device 24 communicates with the Ethernet-based DSL modems 80 and 82 using an IP Point-to-Point Protocol (PPP) over the first Ethernet standard with the DSL physical layer. The remote Ethernet device 26 communicates with the Ethernet-based DSL modems 84 and 86 using IP/PPP over the first Ethernet standard with the DSL physical layer.

The Ethernet-based DSL modems 80, 82, 84 and 86 may communicate with the personal computers 90, 92, 94 and 96 using any of a variety of standards. For purposes of illustration and example, the Ethernet-based DSL modems 80, 82, 84 and 86 communicate with the personal computers 90, 92, 94 and 96 using IP/PPP over Ethernet using a Category 5 cabling.

A plurality of remote Ethernet devices, including the remote Ethernet devices 24 and 26, communicate with an Ethernet switch 100. The Ethernet switch 100 is typically disposed at a telephone central office 102, although alternative locations are also contemplated. The Ethernet switch 100 communicates with each remote Ethernet device via a corresponding fiber optic medium using an Internet Protocol over a second Ethernet standard. Preferably, the second Ethernet standard comprises a gigabit Ethernet standard. Alternatively, the second Ethernet standard comprises another Ethernet standard suitable for communicating data over fiber optic transmission media.

The Ethernet switch 100 provides a termination point of a packet data core network 104. The Ethernet switch 100 serves to switch packets between the remote Ethernet devices, including remote Ethernet devices 24 and 26, and other core network elements. Examples of the core network elements include, but are not limited to, at least one ATM switch, at least one remote access server (RAS), and at least one Internet Service Provider (ISP). The Ethernet switch 100 may communicate with different core network elements using different standards/protocols and/or different transmission media.

It is noted that the Ethernet switch 100 may be embodied by a router which performs the functions described herein. Thus, for the purpose of this patent application, the term "Ethernet switch" should be construed as inclusive of both Ethernet switches and routers.

Figure 2:
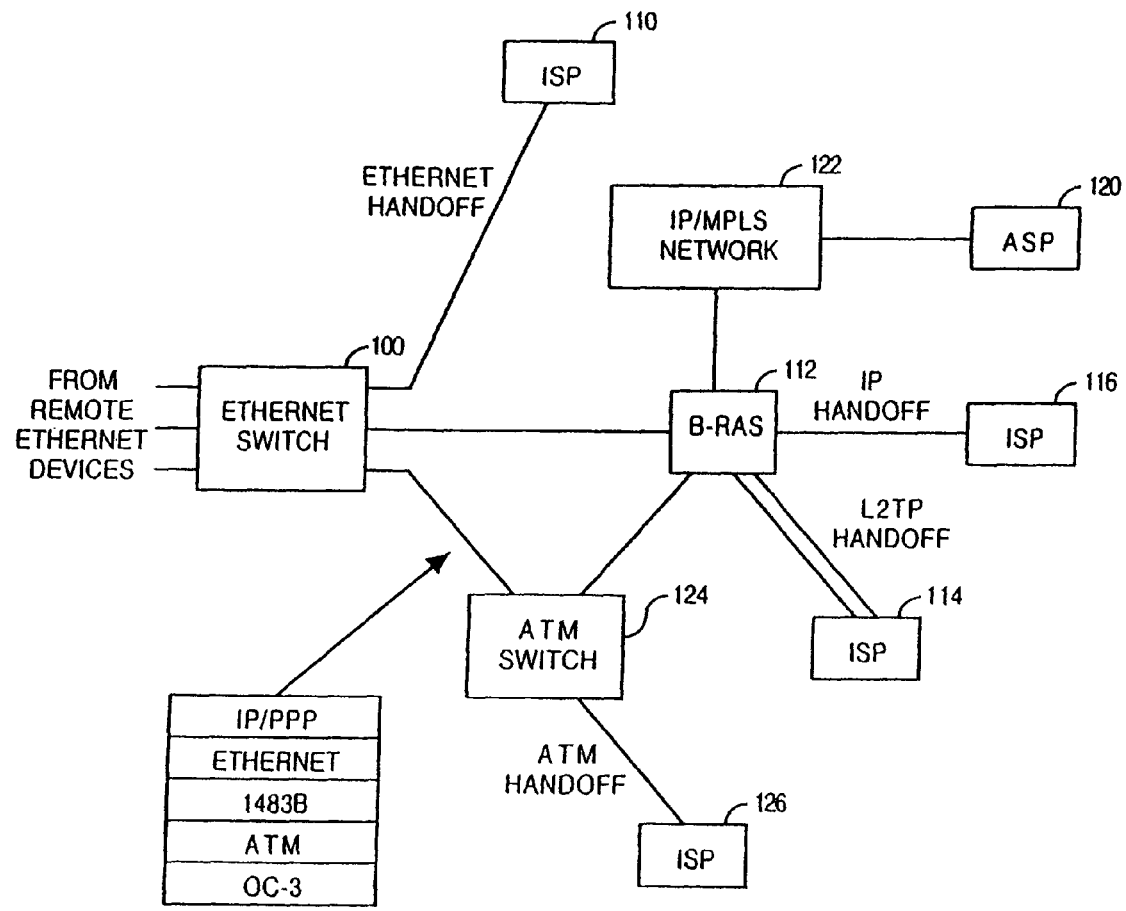
FIG. 2 is a block diagram of an embodiment of the Ethernet switch with other elements in the packet data core network.

FIG. 2 is a block diagram of an embodiment of the Ethernet switch 100 with other elements in the packet data core network 104. The Ethernet switch 100 may communicate packets with an ISP 110 using IP over an Ethernet standard. The Ethernet switch 100 may communicate packets with a Broadband Remote Access Server (B-RAS) 112 using IP over a gigabit Ethernet standard. The B-RAS 112, in turn, may provide access to an ISP 114 using Layer 2 Tunneling Protocol (L2TP) or another secure, high-priority temporary path through the Internet, or an ISP 116 using a standard IP handoff. The B-RAS 112 may provide access to application service providers (ASPs) 120 via an IP/MPLS network 122. The Ethernet switch 100 may communicate packets with an ATM switch 124 using IP/PPP over Ethernet using Multiprotocol Encapsulation over ATM such as 1483B using an Optical Carrier 3 (OC-3) transmission medium. The ATM switch 124 may communicate with an ISP 126 using an ATM handoff. The ATM switch 124 may communicate with the RAS 112.

Routing to different ISPs is facilitated using Layer-2-based Virtual Local Area Network (VLAN) routing. The QoS provided by the Ethernet-based DSL is facilitated using a bridge interworking function and traffic engineering. At the edge of the network, QoS is provided using IP/RSVP. RSVP allows network resources to be reserved and different QoS levels to be offered. In the core of the network, QoS is provided using ATM/MPLS.

The aforementioned system provides an Ethernet-based DSL infrastructure in which low-cost remote Ethernet device terminals are deployed in neighborhood SAIs to act as Ethernet bridges connecting customer premises modems to the packet core network using end-to-end Ethernet. Communication between the modems and the remote Ethernet devices uses IP/Ethernet over existing twisted pair telephone lines. Communication between the remote Ethernet devices and the Ethernet switch is gigabit Ethernet/optical fiber.

Figure 3:
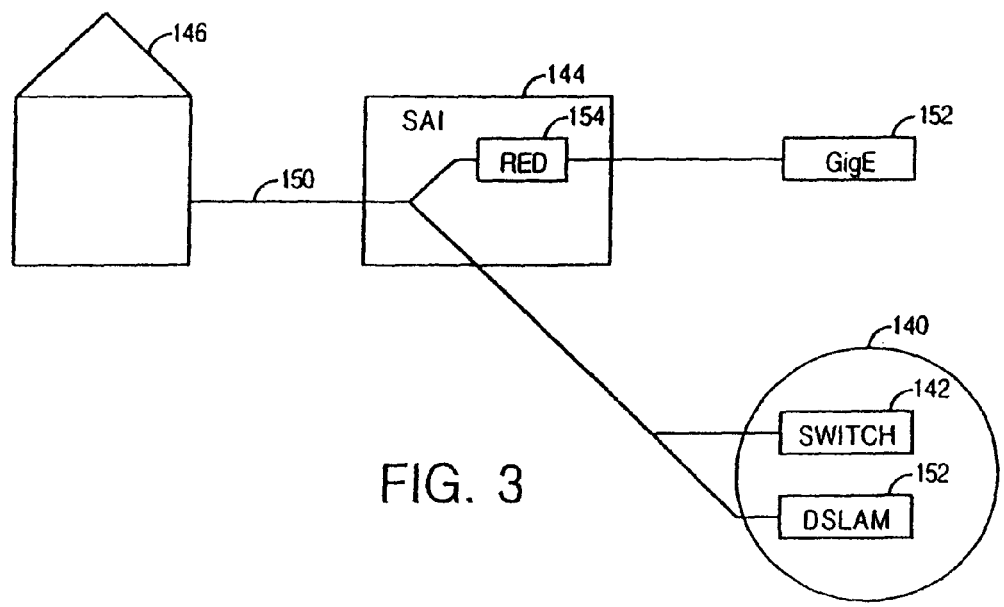
FIG. 3 is a block diagram illustrating the coexistence of a legacy system and an embodiment of the Ethernet-based DSL system.

Beneficially, the aforementioned system can be implemented with little or no impact on legacy telephone and DSL systems. FIG. 3 is a block diagram illustrating the coexistence of a legacy system 140 and an embodiment of the Ethernet-based DSL system. The legacy system 140 comprises a telephone switch 142, such as a Class 5 switch, which provides telephone service to one or more neighborhood service areas. The switch 142 is linked to one or more SAIs, such as an SAI 144. The SAI 144 serves as an aggregation point for telephone service in a neighborhood service area. A customer premise 146 in the neighborhood service area is linked to the SAI 144 by standard telephone transmission line 150. Optionally, the legacy system 140 further comprises a conventional DSL deployment, including a DSLAM 152. The DSLAM 152 is capable of providing conventional DSL service to the customer premise 146 via the standard telephone transmission line 150 and the SAI 144.

The Ethernet-base DSL system augments the legacy system by adding a herein-disclosed remote Ethernet device 154 to the SAI 144. The SAI 144 provides commercial power and fiber equipment termination to enable the remote Ethernet device 154 to be housed and operated therein. The remote Ethernet device 154 is coupled to the customer premise 146 via the standard telephone transmission line 150.

The remote Ethernet device 154 is coupled to the Ethernet switch using either legacy fiber optic media, additional fiber optic media, or a combination thereof. For example, current ADSL Remote Terminations (RTs) may be used as the deepest and closest point of fiber termination between the network and the SAI. Additional optical fiber can be spliced from the RTs all the way to the SAIs to allow the fiber plant to be extended deeper into the network.

Referring back to FIG. 1, the customer premises 40, 46, 52 and 56 having the Ethernet-based DSL service may have filters 160, 162, 164 and 166 interposed between their telephone lines and telephones 60, 66, 72 and 76, respectively. As is well known, the filters 160, 162, 164 and 166 mitigate interference between DSL and voice services.

Figure 4:
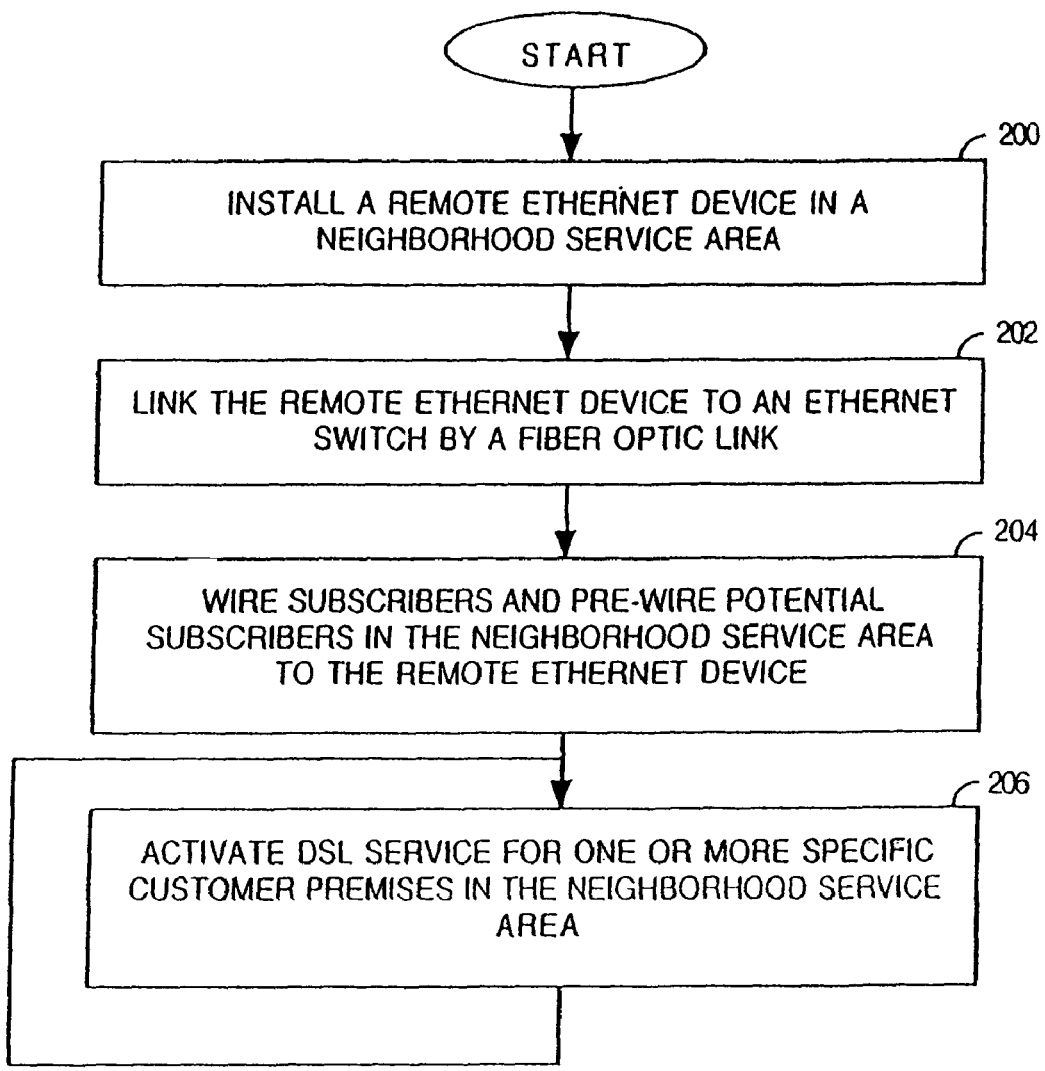
FIG. 4 is a flow chart of an embodiment of a method of performing bulk subscriber pre-wiring.

FIG. 4 is a flow chart of an embodiment of a method of connecting subscribers and potential subscribers in a neighborhood service area to the DSL network. As indicated by block 200, the method comprises installing a remote Ethernet device in a neighborhood service area. Preferably, the remote Ethernet device is housed in an SAI for the neighborhood service area.

As indicated by block 202, the method comprises linking the remote Ethernet device to the Ethernet switch by a fiber optic link. If a bundle of fiber pre-exists between the SAI at which the remote Ethernet device is disposed and the Ethernet switch, this act may comprise tying into one or more unused fibers in the bundle to link the remote Ethernet device to the Ethernet switch. Alternatively, this act may comprise installing a fiber optic link between the SAI at which the remote Ethernet device is disposed and a deepest point of existing fiber in the network, and splicing the fiber optic link to the existing fiber. For example, this act may comprise installing a fiber optic link between the SAI at which the remote Ethernet device is disposed and an ADSL RT, and splicing the fiber optic link to another fiber optic link between the ADSL RT and the Ethernet switch. As another alternative, this act may comprise installing the fiber optic link between the SAI at which the remote Ethernet device is disposed and the Ethernet switch.

As indicated by block 204, the method comprises wiring subscribers and pre-wiring potential subscribers in the neighborhood service area to the remote Ethernet device. Preferably, this act comprises connecting an existing telephone line for each customer premise in the neighborhood service area to the remote Ethernet device. Alternatively, this act may comprise installing an additional twisted pair line to the remote Ethernet device for at least one customer premise in the neighborhood service area.

As those having ordinary skill in the art will recognize, the acts described with reference to blocks 202 and 204 may be performed either in an opposite order or concurrently.

The acts described with reference to blocks 200, 202 and 204 facilitate bulk subscriber pre-wiring for the Ethernet-based DSL service. All subscribers and non-subscribers for a given remote Ethernet device are pre-wired substantially simultaneously or otherwise contemporaneously. For example, an entire neighborhood associated with a coverage area of one or more co-located remote Ethernet devices can be pre-wired by a single truck roll. While the various customer premises are pre-wired, they are not yet activated. Thus, non-subscriber premises in the neighborhood are pre-wired to the remote Ethernet device, but are inhibited from using the Ethernet-based DSL service.

As indicated by block 206, the method comprises activating the Ethernet-based DSL service for one or more specific customer premises. The activation is performed based on a subscription to the Ethernet-based DSL service by the one or more customer premises. For example, an individual at a customer premise may decide at any time (e.g. days, weeks, months, or years) after bulk pre-wiring that he/she wishes to subscribe to the Ethernet-based DSL service.

In one embodiment, the Ethernet-based DSL service is established in response to a message from a broadband carrier's Operation, Administration, Maintenance and Provisioning (OAM&P) system. The message effectively activates a given customer premise identified by its MAC address. Once the customer has been authorized by the broadband carrier, service activation with an ISP may commence. Optionally, another message from the OAM&P can effectively de-activate a given customer premise identified by its MAC address. This feature allows the broadband carrier to halt service to selected customer premises, e.g. for lack of payment.

Activation of subscribers can be either manual or automatic. An example of manual activation is when an individual calls a service representative to order the Ethernet-based DSL service. In this case, the service representative or other personnel can cause a message to be sent which causes the customer premises of the individual to be activated for the Ethernet-based DSL service.

An example of automatic activation is when a customer premise modem attempts to initialize contact with the Ethernet-based DSL network. In this case, activation information is passed along from the customer premise via the remote Ethernet device to an appropriate ISP. This can be accomplished using several known approaches including, but not limited to, Dynamic Host Configuration Protocol (DHCP) and Point-to-Point Protocol over Ethernet (PPPoE). An additional handshake sequence is performed to ensure that the ISP has be granted permission by the broadband carrier to provide broadband service to the customer.

Figure 5:
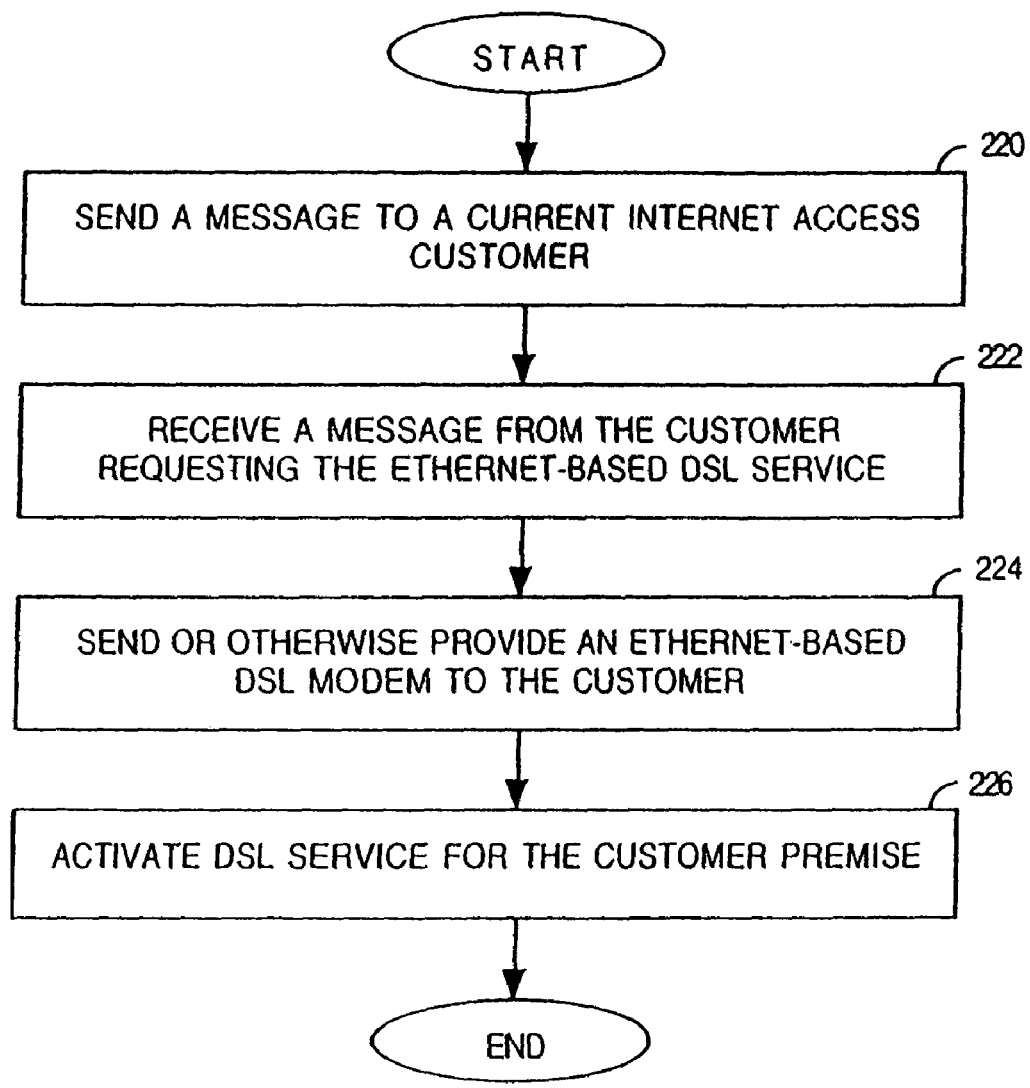
FIG. 5 is a flow chart of an embodiment of a method of marketing the Ethernet-based DSL service.

FIG. 5 is a flow chart of an embodiment of a method of marketing the Ethernet-based DSL service. As indicated by block 220, the method optionally comprises an act of sending a message to a current dial-up, cable modem, or conventional DSL customer. The message indicates the existence of the Ethernet-based DSL service, and various features and benefits provided thereby. The message may also indicate that the premise of the customer already has been pre-wired to the Ethernet-based DSL access network. The message may be included in an electronic mail message, an instant message, a Web page or a pop-up window provided to the customer using his/her current mode of Internet access (e.g. by either dial-up connection, cable modem connection or conventional DSL connection).

As indicated by block 222, the method comprises receiving a message from the customer to request the Ethernet-based DSL service. The message may be based on a customer-initiated input within the e-mail document, Web page or pop-up window provided to the customer. For example, an HTML document or a document in another markup language may have a clickable button which allows the customer to request the Ethernet-based DSL service. Alternatively, the message may be included in either an electronic mail message or an instant message sent by the customer.

As indicated by block 224, the method optionally comprises sending or otherwise providing an Ethernet-based DSL modem to the customer. The Ethernet-based DSL modem enables the customer to access the Ethernet-based DSL service using his/her computer or alternative network access terminal. This act need not be performed if the customer already has a DSL modem suitable for Ethernet-based DSL. Modems that enable both conventional-DSL and Ethernet-based DSL, or both cable modem service and Ethernet-based DSL, are contemplated so that customers may instantly switch to the Ethernet-based DSL service.

As indicated by block 226, the method comprises activating the Ethernet-based DSL service for the customer premise. Activation may be performed as described with reference to FIG. 4. As those having ordinary skill in the art will recognize, the acts described with reference to blocks 224 and 226 may be performed either in an opposite order or concurrently.

The method of FIG. 5 is of particular benefit to telecommunication companies which provide multiple types of Internet access, one of which being the Ethernet-based DSL service. The telecommunication companies can move their existing dial-up and conventional DSL customers to the Ethernet-based DSL service to provide enhanced service(s).

The herein-disclosed embodiments of an Ethernet-based DSL system have many practical applications. The remote Ethernet devices 24 and 26 can support always-on service with dedicated per customer or shared service (e.g. distributed/oversubscribed service) of several megabits per second. Current technology with loop lengths of up to 6000 feet provides speeds of 10 Mbps on the downlink and 2 Mbps on the uplink with VDSL. Examples services that can be offered with the herein-disclosed Ethernet-based DSL service include, but are not limited to, Web browsing, unified messaging with wireless access, telecommunications portal such as a personal communications manager, home monitoring and meter reading, video conferencing, and interactive data services such as gaming, applications-on-demand, music services such as a virtual juke box, e-commerce and video-on-demand.

Further, the herein-disclosed embodiments of an Ethernet-based DSL system facilitates network integration at the IP layer. A variety of services may be provided to the application layer, including but not limited to, Authentication, Accounting and Authorization (AAA), profile preferences, network and device attributes.

Figure 6:
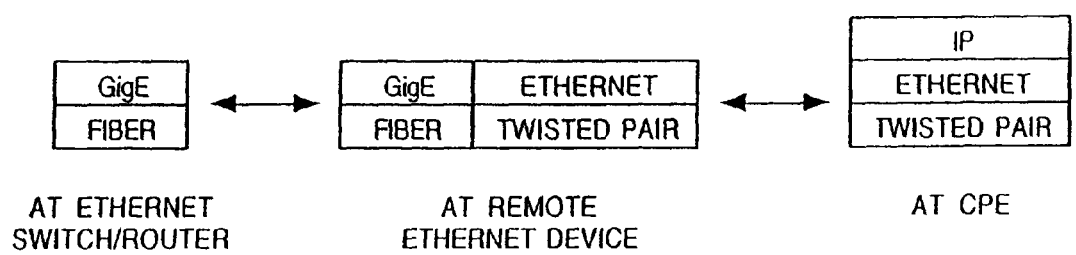
FIG. 6 is a block diagram of the protocol stacks used in a preferred embodiment of the Ethernet-based DSL system.

FIG. 6 is a block diagram of the protocol stacks used in a preferred embodiment of the Ethernet-based DSL system. The Ethernet switch 100 communicates with the remote Ethernet devices 24 and 26 with a protocol stack comprising gigabit Ethernet using fiber optic. The remote Ethernet devices 24 and 26 communicate with the CPEs with a protocol stack comprising IP over Ethernet using twisted pair.

It is noted that each remote Ethernet device can have removable line cards at the F1 and F2 interfaces. This allows the F1 and F2 interfaces to be upgraded independently as faster Ethernet standards and improved physical layer modulation techniques are available. As Ethernet rates increase, the gigabit Ethernet/fiber backhaul interface may be upgraded by upgrading Ethernet line cards at the F1 interface of the remote Ethernet device and the terminating Ethernet switch/router in the core network. As physical layer modulation techniques over copper improve, the modem and the line cards at the F2 interface of the remote Ethernet device may be upgraded.

It will be apparent to those skilled in the art that the disclosed inventions may be modified in numerous ways and may assume many embodiments other than the preferred forms specifically set out and described herein.

Accordingly, it is intended by the appended claims to cover all modifications which fall within the true spirit and scope of the present invention.

The invention claimed is:

1. A broadband communication channel access network comprising:
    an Ethernet device disposed in a serving area interface (SAI), the Ethernet device to serve as an Ethernet bridge for a neighborhood service area;
    wherein the Ethernet device disposed in the SAI communicates with a plurality of customer premises modems in the neighborhood service area; and
    wherein the Ethernet device disposed in the SAI comprises an interface to communicate via a fiber optic link with an Ethernet switch located in a central office.

2. The broadband communication channel access network of claim 1, wherein the Ethernet device and the SAI are located on an easement.

3. The broadband communication channel access network of claim 1 wherein the SAI comprises a ground-level utility box, and wherein the Ethernet device is disposed in the ground-level utility box.

4. The broadband communication channel access network of claim 1 wherein the SAI comprises a box on a utility pole, and wherein the Ethernet device is disposed in the box on the utility pole.

5. The broadband communication channel access network of claim 1 wherein the SAI comprises an underground utility box, and wherein the Ethernet device is disposed in the underground utility box.

6. The broadband communication channel access network of claim 1 wherein the Ethernet device communicate with the plurality of customer premises modems using an Ethernet standard comprising a Twisted Ethernet standard, and wherein the Ethernet device is to communicate with at least two of the customer premises modems by a corresponding twisted pair line.

7. The broadband communication channel access network of claim 1 wherein the Ethernet device communicate with the plurality of customer premises modems using an Ethernet standard comprising a Twisted Ethernet standard, and wherein the Ethernet device is to communicate with at least two of the customer premises modems by a corresponding twisted pair telephone service line.

8. The broadband communication channel access network of claim 1 wherein the Ethernet device communicates with the Ethernet switch using an Internet Protocol over an Ethernet standard.

9. The broadband communication channel access network of claim 8 wherein the Ethernet standard comprises a gigabit Ethernet standard.

10. The broadband communication channel access network of claim 1 wherein the Ethernet device communicates with the plurality of customer premises modems using an Internet Protocol over an Ethernet standard with a digital subscriber line physical layer based on at least one of Data Over Cable Service Interface Specifications (DOCSIS), Asymmetric Digital Subscriber Line (ADSL), Very-high-data-rate Digital Subscriber Line (VDSL), Symmetrical Digital Subscriber Line (SDSL), and Multirate Digital Subscriber Line (MDSL).

11. The broadband communication channel access network of claim 1 wherein the Ethernet device comprises a first removable line card and a second removable line card, the first removable line card providing an F1 interface, the second removable line card providing an F2 interface.

12. A broadband communication channel access network comprising:
    a first Ethernet device disposed in a serving area interface (SAI) to serve as an Ethernet bridge for a first neighborhood service area, the first Ethernet device to communicate with a plurality of customer premises modems in the first neighborhood service area; and
    an Ethernet switch disposed at a central office, the Ethernet switch to communicate with the first Ethernet device disposed in the SAI via a fiber optic medium.

13. The broadband communication channel access network of claim 12 further comprising:
- a second Ethernet device to serve as an Ethernet bridge for a second neighborhood service area, the second Ethernet device to communicate with a plurality of customer premises modems in the second neighborhood service area;
- wherein the Ethernet switch also communicates with the remote Ethernet device via a fiber optic medium.

14. The broadband communication channel access network of claim 12 wherein the first Ethernet device communicates with the plurality of customer premises modems in the first neighborhood service area using an Internet Protocol over a first Ethernet standard comprising a Twisted Ethernet standard, and wherein the first Ethernet device is to communicate with at least two of the customer premises modems by a corresponding twisted pair line.

15. The broadband communication channel access network of claim 12 wherein the first Ethernet device communicates with the plurality of customer premises modems in the first neighborhood service area using an Internet Protocol over a first Ethernet standard comprising a Twisted Ethernet standard, and wherein the first Ethernet device is to communicate with at least two of the customer premises modems by a corresponding twisted pair telephone service line.

16. The broadband communication channel access network of claim 12 wherein the Ethernet switch communicates with the first Ethernet device over an Ethernet standard comprising a gigabit Ethernet standard.

17. The broadband communication channel access network of claim 12 wherein the first Ethernet device communicates with the plurality of customer premises modems in the first neighborhood service area using an Internet Protocol over a first Ethernet standard with a digital subscriber line physical layer based on at least one of Data Over Cable Service Interface Specifications (DOCSIS), Asymmetric Digital Subscriber Line (ADSL), Very-high-data-rate Digital Subscriber Line (VDSL), Symmetrical Digital Subscriber Line (SDSL), and Multirate Digital Subscriber Line (MDSL).

18. The broadband communication channel access network of claim 12 wherein the Ethernet switch is to switch packets between the first Ethernet device and at least one asynchronous transfer mode (ATM) switch, at least one access server (RAS), and at least one Internet Service Provider (ISP).

19. A method of providing an Ethernet-based digital broadband service, the method comprising:
- installing an Ethernet device in a serving area interface (SAI) of a neighborhood service area that communicates via a fiber optic link with an Ethernet switch located in a central office, the Ethernet device to serve as an Ethernet bridge for Ethernet-based digital broadband service subscribers in the neighborhood service area; and
- pre-wiring a plurality of customer premises in the neighborhood service area to the Ethernet device.

20. The method of claim 19 further comprising:
- receiving a request of the Ethernet-based digital broadband service for the customer premise after said pre-wiring; and
- activating the Ethernet-based digital broadband service for the customer premise based on the request.

21. The method of claim 20 wherein a telecommunication company provides the Ethernet-based digital broadband service and another mode of Internet access, wherein the customer premise is an existing customer of the telecommunication company for the other mode of Internet access at a time of said receiving the request.

22. The method of claim 21 wherein the request is received from the customer premise via the other mode of Internet access.

23. The method of claim 21 wherein the other mode of Internet access is digital subscriber line (DSL) service.

24. The method of claim 21 wherein the other mode of Internet access is a dial-up service.

25. The method of claim 20 further comprising:
- providing an Ethernet-based DSL modem to the customer premise based on the request.

26. The method of claim 19 wherein said pre-wiring comprises contemporaneously pre-wiring all of the customer premises in the neighborhood service area to the Ethernet device.

27. The method of claim 19 wherein said pre-wiring comprises pre-wiring substantially all customer premises in the neighborhood service area to the Ethernet device.

28. The method of claim 19 wherein said pre-wiring comprises connecting an existing telephone line for each of the customer premises to the remote Ethernet device.

29. The method of claim 19 further comprising:
- linking the Ethernet device to an Ethernet switch by a fiber optic link.

30. The method of claim 29 wherein the fiber optic link comprises one or more unused fibers in a pre-existing bundle of fiber between a serving area interface (SAI) and a central office.

31. The method of claim 29 wherein said linking comprises:
- installing a fiber optic link between the Ethernet device and the Ethernet switch.

32. The method of claim 29 wherein said linking comprises:
- installing a fiber optic link between the Ethernet device and a closest point of existing fiber;
- splicing the fiber optic link to the existing fiber; and
- connecting the existing fiber to the Ethernet switch.

* * * * *